UNITED STATES PATENT OFFICE.

CLARENCE E. VAN AUKEN, OF CHICAGO, ILLINOIS, ASSIGNOR TO JUNIUS ROGERS, OF SAME PLACE.

PRESSURE-REGULATOR.

SPECIFICATION forming part of Letters Patent No. 533,684, dated February 5, 1895.

Application filed October 12, 1894. Serial No. 525,702. (No model.)

*To all whom it may concern:*

Be it known that I, CLARENCE E. VAN AUKEN, a resident of Chicago, in the county of Cook and State of Illinois, have invented certain new and useful Improvements in Pressure-Regulators, of which the following is a full and complete description, sufficient to enable those skilled in the art to which it pertains to understand, make, and use the same, reference being had to the drawings accompanying and forming a part hereof.

This invention relates to pressure regulators designed to be interposed between a supply main or pipe and a service main or pipe in a system or plant wherein the pressure of the fluid in the supply main or pipe (usually steam) is, or may be, variable, but at all times greater than the pressure of the fluid in the service main or pipe; such fluid in the service main extending through the pressure regulator from the supply main; and the pressure thereof being determined and controlled by such pressure regulator.

The object of this invention is to obtain a pressure regulator capable of close adjustment; that is, a pressure regulator whereby the pressure of the fluid in the service main or pipe can be definitely and closely determined; to obtain a pressure regulator which can be adjusted to maintain a very low pressure in the service main; to obtain a pressure regulator which, when automatically operated by a variation of the determined pressure of the fluid in the service main, (or the outlet chamber of the regulator,) shall work gradually and quickly, and cease its movement or operation so soon as the determined pressure of fluid has been re-established: to obtain a pressure regulator which, when interposed between the supply main or pipe and the service main or pipe of a system or plant wherein an engine, pump, or other throbbing (or pulsating) machine is placed, shall not require the use of a dash pot or other device to insure its desired and uniform working: and to obtain a pressure regulator possessing the functions hereinbefore ascribed thereto which shall be simple in construction, not liable to get out of order, and durable, the parts thereof being so disposed as to be well adapted to withstand the wear incident to use.

Figure 1:
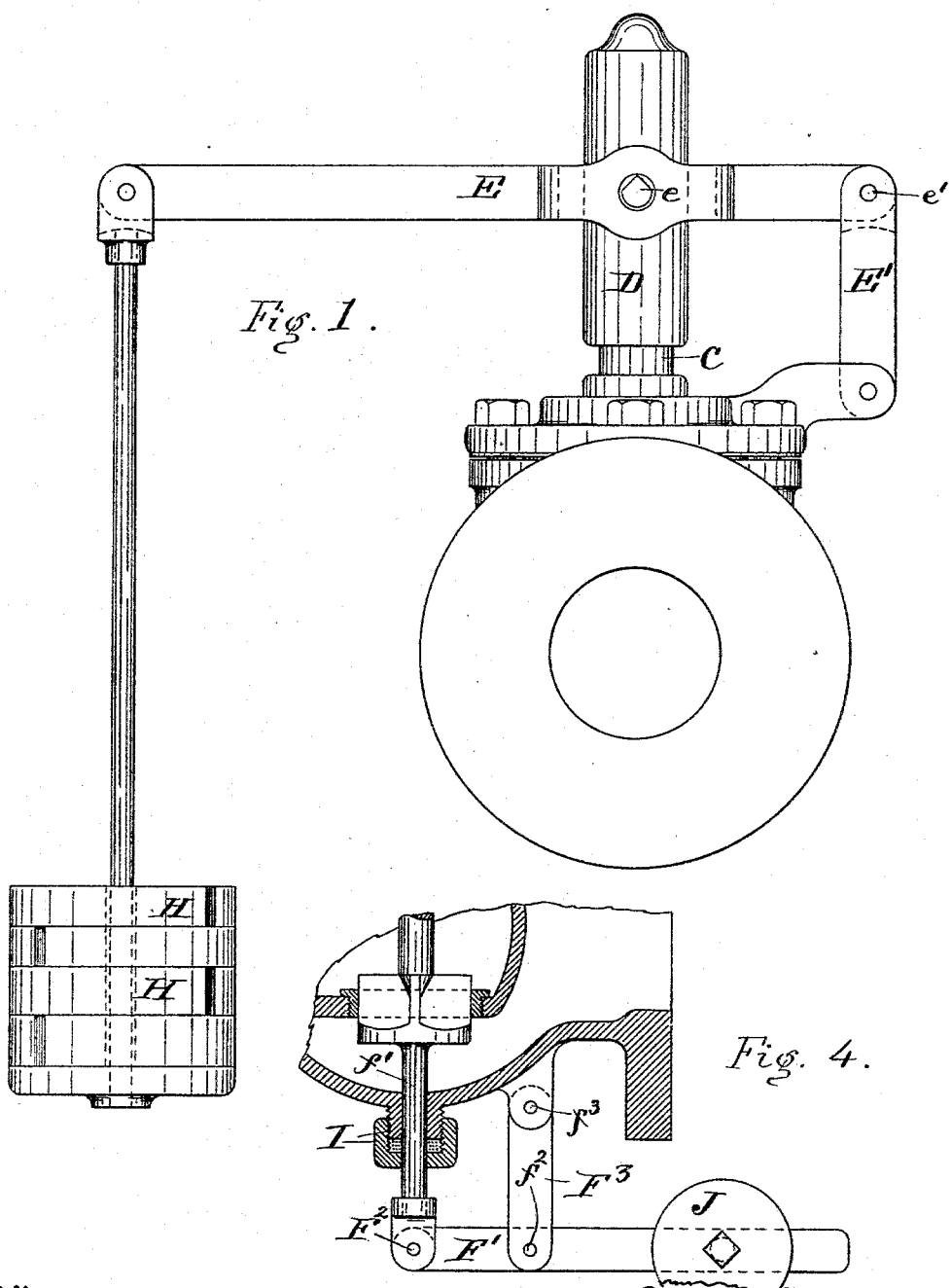
Figure 2:
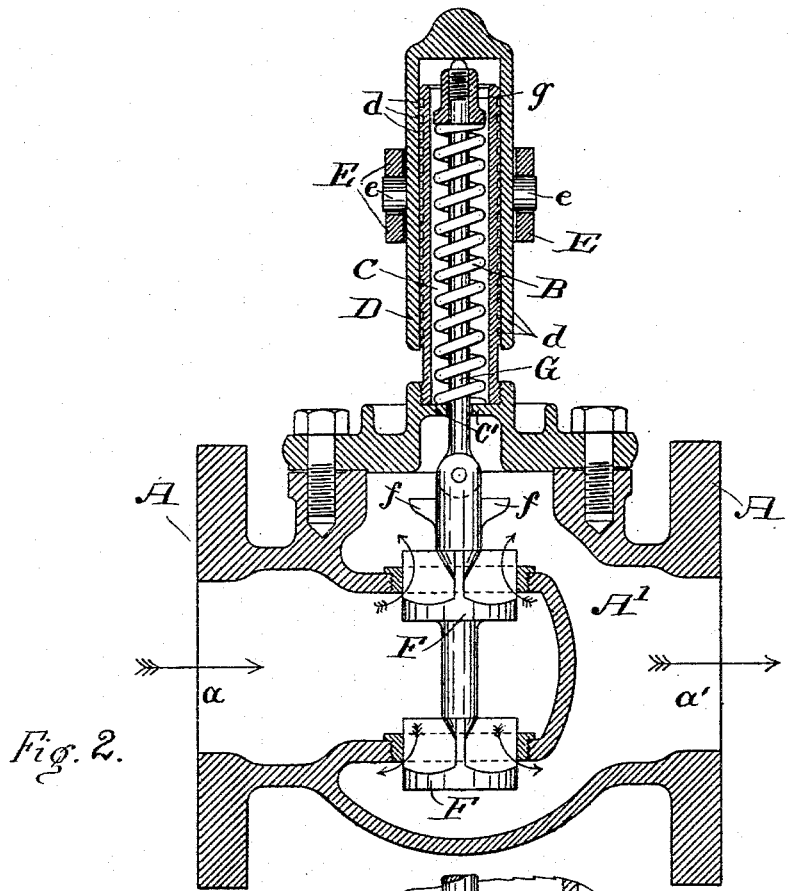
Figure 3:
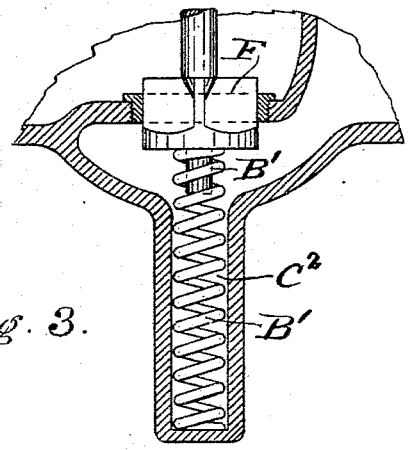

In the drawings referred to as forming a part of this specification, Figure 1 is an elevation of the pressure regulator embodying the invention, and Fig. 2 a vertical sectional view thereof. Fig. 3 is a modified construction of a part of the machine illustrated in Figs. 1 and 2; and Fig. 4 is an additional modification of the parts illustrated in Fig. 3.

A reference letter applied to a given part is employed to designate such part throughout the several views.

A is a shell or casing; A', the outlet chamber; $a$, the inlet, and $a'$ the outlet of the pressure regulator.

B is a spring placed in cylinder C so that the lower end thereof rests upon and is supported by the abutment C'.

$C^2$ is a passage way for fluid from outlet A' to cylinder C.

D is a hood placed over the cylinder C and extending down the outside thereof.

$d, d$, are annular grooves placed on the outside of the cylinder C or on the inside of the cylindrical portion of the hood D, and serving as pockets holding or adapted to hold water of condensation formed by the passage of steam from chamber A' between cylinder C and hood D. These water pockets are not claimed by me to be new in pressure regulators.

E is a yoked lever fulcrumed at $e'$ on link E'.

$e, e$, are lugs rigidly attached to hood D. Yoked lever E rests on the lugs $e, e$.

F is a double seated balance valve.

G is a standard loosely connected to valve F and extending upward above the spring B and to the hood D, such hood resting on the upper end thereof.

$g$ is an abutment secured on the standard G. The abutment may have a slight adjustment on the standard G, but none is required. Where an adjustment is to be obtained I prefer to thread the upper end of the standard and place corresponding threads on the inside of the hole extending through the abutment, as illustrated in Fig. 2.

The upper end of the spring B abuts against the lower face of the abutment $g$ and thereby tends to force the standard G upward to close the valve F.

$f$ is a stop limiting the upward movement of the valve F.

H, H are weights suspended on yoked e-ver E.

Weights H, H, as well as the weight lever E, hood D, standard G, and valve F, tend to force such valve downward, off the seat thereof, against the resilience of spring B. Fluid under pressure in chamber A' and spring B tend to force the standard G, hood D, lever E and weights H, H, upward, such standard G drawing the valve F upward, into a position whereby the valve F is closed on its seat. An equilibrium is, therefore, established in such parts when the upward pressure of the fluid in chamber A' balances the downward pressure of weights H, H, (in excess of the part or portion of such weights required to balance the upward pressure of the spring B.) By adding to the weights H, H, the pressure of the fluid in chamber A' will, therefore, be greater, to balance such weights; and by taking a part or portion of such weights away the pressure of the fluid in chamber A' required to balance the several parts will be less.

As a portion, and any portion desired, of the weights H, H, may be used to balance the upward force exerted by spring B, I find, in practice, that a spring having many times the resiliency or force required to raise the valve F, standard G, hood D and yoked lever E may be used. Any tendency of the spring to break from overwork and any loss of resiliency are thus provided for. Further, I have found in practice, that where a part or portion of the weights H, H, (and that too, a considerable part thereof) is used to balance the resiliency of the spring B, the device is extremely sensitive to any variation in pressure of the fluid in chamber A'. I have found, also, that when from any increase or decrease in the pressure of the fluid in chamber A' movement of the valve F is produced, in the manner described, such movement is steady and uniform, without chattering or churning; and particularly I have found that where the movement of the valve F is downward, because of a decrease of the pressure of the fluid in chamber A' because of the gradual increase in resistance to such downward pressure afforded by spring B, such movement will cease immediately the desired pressure of the fluid is attained or regained. This uniform and gradual working of the device, without chattering or churning is obtained even though a pump or engine be connected to the system or plant near to the pressure regulator, and hence no dash pot or other like device is required to be used in connection with or in addition to my pressure regulator.

Another advantage obtained by me in the employment of a spring to close the valve F and weights working, (by gravity) against the resiliency of the spring and the upward pressure of the fluid in chamber A' to open such valve, is that I am able to maintain a constant low pressure in the service main, that is a pressure not exceeding one pound; making the pressure regulator particularly well adapted to be used in heating systems wherein, at times, an extremely low pressure of steam is desired.

In the modification illustrated in Fig. 3, spring B' is substituted for spring B. $C^2$ is a pocket provided for the placing therein of spring B'. Spring B' presses upward against valve F, tending to close it.

In the modification illustrated in Fig. 4, a weight is substituted for springs B, B', respectively. To so substitute the weight for a spring, valve F has stem $f'$ extending through casing A to lever F', to which it is secured by pin or pivot $F^2$. $F^3$ is a link connected at $f^3$ to casing A and at $f^2$ to lever F'. I is a stuffing box, and J a weight. Weight J may be adjustably suspended on lever F', as illustrated.

In Fig. 4 the valve F is shown as opened to its greatest possible extent, at which time the lever F' is in a substantially horizontal position. At such time the weight J therefore, exerts its greatest possible upward pressure or force, and as the valve closes the weight falls, thus gradually exerting less upward pressure or force on the valve. In this manner the working of a spring is approximated.

I prefer the construction illustrated in Figs. 1, 2; but do not limit myself thereto. It is evident that a spring may be substituted for weights H, H, or for some of them, if preferred.

Having thus described the invention, its construction and operation, what I claim as new, and desire to secure by Letters Patent, is—

1. In a pressure regulator, a piston and cylinder, grooves forming water pockets interposed between the piston and cylinder, a double seated valve, the valve and piston so related that the movement of the piston in one direction opens the valve and the movement of the valve in closing forces the piston in the opposite direction to that first named, a spring tending to close the valve, and weights suspended by the piston tending to move it in a direction to open the valve; substantially as described.

2. In a pressure regulator, a double seated valve a cylinder communicating with the outlet chamber of the regulator, a longitudinally movable piston, annular grooves forming water pockets interposed between such cylinder and piston, the valve and the piston so related that movement of the piston in one direction opens the valve and the closing of the valve moves the piston, a lever, weights on the lever, the lever abutting against the piston and tending to open the valve, and a spring abutting at one end against the casing and at the other end tending to close the valve; substantially as described.

3. In a pressure regulator, a double seated valve, a standard loosely attached to the valve, a cylinder communicating with the outlet chamber of the regulator, a longitudinally movable hood extending around the cylinder and resting on the standard, a lever connected with the hood, weights suspended on the lever forcing the hood against the standard and tending to open the valve, an abutment on the standard and a spring one end whereof is in contact with the abutment, such spring tending to close the valve but with a force less than the force exerted by the weights to open such valve; substantially as described.

CLARENCE E. VAN AUKEN.

Witnesses:
 FLORA L. BROWN,
 H. J. ROHLT.